United States Patent [19]

Brinckmann

[11] E Re. 30,156

[45] Reissued Nov. 20, 1979

[54] SODIUM ACTIVATED CESIUM IODIDE SCINTILLATOR

[75] Inventor: Paul C. Brinckmann, Munster, Fed. Rep. of Germany

[73] Assignee: The Harshaw Chemical Company, Cleveland, Ohio

[21] Appl. No.: 668,129

[22] Filed: Mar. 18, 1976

Related U.S. Patent Documents

Reissue of:

[64] Patent No.: 3,446,745
Issued: May 27, 1969
Appl. No.: 531,455
Filed: Mar. 3, 1966

U.S. Applications:

[63] Continuation of Ser. No. 364,833, May 29, 1973, abandoned.

[51] Int. Cl.[2] ..... C09K 11/24
[52] U.S. Cl. ..... 252/301.4 H; 250/483
[58] Field of Search ..... 252/301.4 H; 250/483

[56] References Cited

U.S. PATENT DOCUMENTS 3,296,448 1/1967 Swinehart et al. ..... 252/301.4 H X
3,303,342 2/1967 O'Dell et al. ..... 252/301.4 H X

OTHER PUBLICATIONS

Belikovich et al., "Ukr. Fiz Zh", 10(11), pp. 1215–1221, (1965), Chem. Abstracts, vol. 64, p. 9100, 1966.
Kirgintsev et al., "Dokl. Akad. Nauk SSSR", 164(6), pp. 1315–1318, (1965), Chem. Abstracts, vol. 64, p. 5834, 1966.
Samvseva et al., "Chem. Abstracts", vol. 56, p. 10980, 1962.
Knopfe et al., "Z. Naturforsch", 12a, pp. 348–350, (1957).

*Primary Examiner*—Jack Cooper
*Attorney, Agent, or Firm*—Alfred D. Lobo; James A. Lucas

[57] ABSTRACT

This invention comprises a scintillator capable of generating light radiation upon exposure to nuclear radiation such as gamma rays, beta rays, X-rays, etc., in which the transparent optically integral crystalline component thereof consists of a major amount of cesium iodide and a minor amount of a sodium compound, this material being characterized by having an emission peak of about 4200±100 angstrom units.

2 Claims, 1 Drawing Figure

EMISSION SPECTRUM OF CsI(Na)

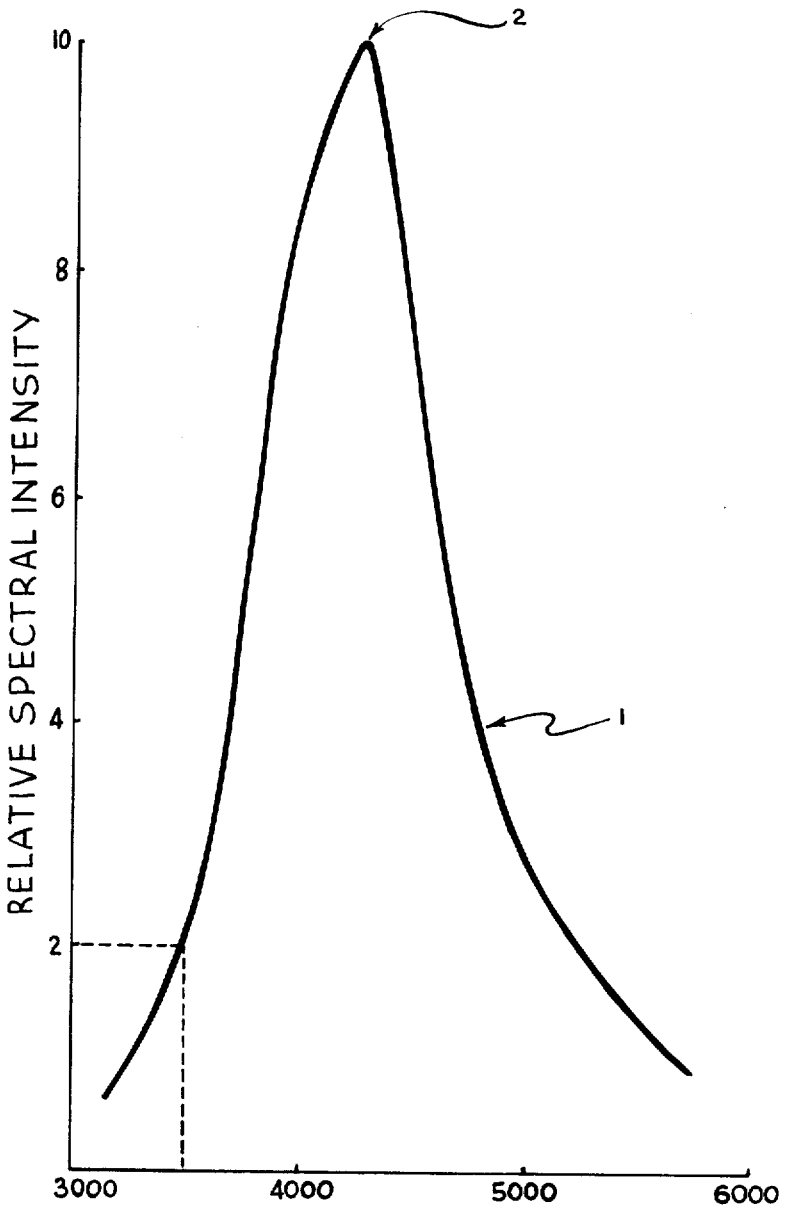
EMISSION SPECTRUM OF CsI(Na)

SODIUM ACTIVATED CESIUM IODIDE SCINTILLATOR

Matter enclosed in heavy brackets [ ] appears in the original patent but forms no part of this reissue specification; matter printed in italics indicates the additions made by reissue.

*This is a continuation of reissue application Ser. No. 364,833, filed 5-29-73, now abandoned.*

My invention relates to radiation responsive elements and more particularly to scintillation elements effective to produce light radiation in response to the excitation thereof by other radiation, such as gamma rays, beta rays, or X-rays, or the like.

Scintillator elements are very useful as components of radiation detectors. In such detectors, the scintillator unit may be a crystal mounted in the detector in such a way as to be readily exposed to and interposed in the paths of radiations of the type to be detected. The scintillator responds to particles of such exciting radiation to produce scintillations which are flashes of light, each time such a particle penetrates the scintillator. In many of these detectors, the scintillator is coupled through some high efficiency light transferring medium or components, to a photomultiplier tube which responds, in turn, to the light flashes to produce corresponding electrical output pulses. The pulses thus are an indication of the exciting particles of radiation.

Because of the remarkable effectiveness and versatility afforded by radiation detection in many fields of search and investigation, these radiation detectors must be capable of producing accurate results in many different uses and many different environments. In cases wherein an indication of the number of radiation particles exciting a scintillator is sought and the rate of such excitation is very high, it is important that the scintillator have a short decay time. That is to say, the time from the beginning of a scintillation to its termination must be very short so that the scintillator has a minimum of time-overlapping scintillations. This is important because the overlapping scintillations would be regarded as one scintillation by the detector. Therefore, an erroneous indication of radiation intensity would be produced.

Another important characteristic of such scintillator is its ability to produce an intense scintillation, or, stated otherwise, have a good pulse height. The light produced by a scintillation may be too low in intensity to withstand the absorption of it in its traverse of the crystal and light coupling elements to the photoresponsive element of a photomultiplier tube whereby it fails to excite the tube appropriately and is thus lost, and an erroneous count is produced. Also, because of the scintillator "noise" produced by extraneous radiations penetrating the scintillator or the electrical "noise" produced within the photomultiplier tube itself, it is important that the desired scintillation and consequent electrical signal stand out prominently so as to be discernible from these "noises" so created.

Because photoresponsive elements of photomultiplier tubes have different responses to different wave lengths or colors of impinging light, it is desirable in a radiation detector that a scintillator produce strongly that wave length or light which is most effective upon the photomultiplier tube if no other advantages are sacrificed.

A high value of absorptivity of radiations by a crystal is a distinct advantage inasmuch as the same absorption may be achieved with smaller crystals. Frequently it is important that radiation detectors be placed in a confining space and small size facilitates such operation, since the smaller crystal enables a smaller detector to be used.

In addition to the foregoing, because of the many environments in which radiation detectors are employed, it is important in many cases that the scintillator components, as well as other parts, be hardy and durable, and able to withstand vibration, shock, and wide temperature variations. Machinability and resistance to cleavage are advantages in forming and utilizing the crystal. A relatively nonhygroscopic scintillator is advantageous in obviating special equipment and precautions to exclude moist ambient atmospheres.

Solarizing, the characteristic of some scintillator crystals to produce an afterglow after being subjected to sunlight, is most undesirable in that a solarized scintillator crystal is useless as a radiation detector component when exposed to sunlight. It takes too long for such an afterglow to die down and, of course, the crystal may be exposed to sunlight more or less continuously.

Accordingly, it is an object of my invention to provide an improved scintillator crystal having short decay time, high pulse height, and producing wavelengths of light to which photomultiplier tubes are most responsive.

It is another object of my invention to provide scintillation crystals that are nonhygroscopic, hardy and durable, and capable of withstanding wide temperature variations without injury thereto.

It is still another object of my invention to improve the reliability and operation of scintillators by providing a scintillator crystal which is not subject to solarizing in response to sunlight or other types of radiation normally encountered in use.

Pursuant to the foregoing objects and in accordance with my invention, a novel and improved scintillation crystal incorporating the above mentioned desirable characteristics and being without the mentioned disadvantages is provided by the activation of cesium iodide with sodium *compound* in solid solution therewith. Heretofore, in the preparation of scintillator crystals of any materials, the element sodium was considered an undesirable impurity and certainly unsuitable as an activator. Accordingly, the concern regarding sodium was to remove as much of it as possible in any purification procedures carried out on crystal ingredients. However, I have discovered that activation of cesium iodide with sodium produces a most effective scintillator crystal having not only very desirable operative and performance characteristics, but physical advantages as well.

Other and further important objects and advantages of my invention will become apparent from the following detailed description of a preferred embodiment thereof taken with the accompanying drawing in which the single FIGURE shows emission characteristics of a crystal according to my invention.

In the preparation of sodium activated cesium iodide crystals according to my invention, the well known crystal preparation and growing procedures, such as the Kyropoulos furnace (see Z. Phys. Chem. 92, 219), or Stockbarger furnace (See U.S. 2,149,076), may be employed. Crystals may be grown from a melt starting with cesium iodide, ultra pure, and the addition of sodium iodide, ultra pure. Alternatively, cesium iodide may be activated by the addition of either sodium hydroxide, sodium fluoride, or sodium bromide.

Crystals of sodium activated cesium iodide have been prepared with concentrations of sodium activator from a mere trace to 0.220 mole percent analyzed. It is to be noted that it may not be assumed that concentrations of activator material added to a "load" or "melt" in preparation of a crystal produces a like concentration of sodium activator in a grown crystal as determined by laboratory analysis and that frequently there is a considerable variance in these concentrations. In the range of activator concentration from 0.040 mole percent to 0.220 mole percent, the crystals exhibited good pulse height, in the range of from 79 percent to 93 percent relative to a sodium iodide, thallium activated crystal taken as a standard. Also, these crystals exhibited good resolution from 9.5 percent to 9 percent, wherein resolution percentage is defined as the energy difference at half height of a peak, divided by energy at the peak, multiplied by 100, when the emission characteristic is plotted intensity versus energy. The good quality of crystals achieved with activator concentrations of 0.220 mole percent indicates that, within the purview of my invention, even higher concentrations of activator may be employed. Also, cesium iodide crystals with sodium activator concentrations as low as 0.017 mole percent, while producing lower pulse heights and having poorer resolutions, were found to exhibit characteristics rendering them satisfactory for some crystal purposes.

Referring to the drawing, the curve 1 illustrates the emission characteristics of sodium activated cesium iodide when excited with beta particles from a strontium 90 source. In this FIGURE abscissa represents wave length of scintillation emissions from sodium activated cesium iodide crystals, while the ordinate represents the relative intensity of the different emissions at the respective wave lengths. As an example, at the peak 2 of curve 1, it is indicated that the maximum emission from the crystal occurs at a wavelength of approximately 4200 angstrom units and that its relative value of intensity is 10, while emissions at approximately 3500 angstrom units have a relative value of intensity of 2, or one fifth the value at the peak. It is to be noted that having a peak relative emission of the crystal at approximately 4500 angstrom units is a desirable characteristic inasmuch as photoresponsive elements of present photomultiplier tubes are most responsive to scintillations of approximately this wavelength. Accordingly, in this respect the sodium activated cesium iodide scintillation crystal possesses desirable characteristics for operation in a radiation detector.

It is to be noted, also, that the pulse heights and decay times of emission from sodium activated cesium iodide are favorable in relation to emissions from crystals of sodium iodide, thallium activated, as a standard. The relative pulse heights have been observed to be of a value of 90 percent or greater, and the decay constant of sodium activated cesium iodide was determined from a photomultiplier anode current pulse to be 0.65 microsecond. Thus, the crystal provides output pulses of entirely satisfactory energy and of entirely satisfactory decay constant for the use of the crystal in radiation detectors or other uses.

Because of the high absorptivity of cesium iodide, crystals according to my invention may be made small relative to many other crystals, without sacrificing effectiveness or performance of a detector of which they may form a part.

In addition to the operating and performance characteristics of sodium activated cesium iodide scintillator crystals, these crystals have very good physical properties rendering them advantageous for use in detectors. They are durable and not readily subject to cleavage and are relatively nonhygroscopic, being capable of being exposed to normal atmospheres for extended periods without any adverse effects. Crystals exposed for prolonged periods to atmospheres of 70 percent humidity were not adversely affected. Another important quality of sodium activated cesium iodide is that its crystals are nonsolarizing. Under exposure to sunlight they do not turn pink or other color, and have no afterglow when so exposed.

While the invention has been set forth hereinabove with respect to the general practice thereof, the following specific examples are given in order that those skilled in the art may determine specific circumstances under which the invention has been practiced. These examples are given by way of illustration only and are not to be construed in a limiting sense.

Example I

A 2¼ inch diameter platinum crucible is loaded with 250 grams of pure cesium iodide and 2.25 grams of sodium iodide (0.75 mole percent of added sodium iodide). The crucible is placed into a controlled atmosphere, Stockbarger type furnace having upper and lower chambers with an opening therebetween and an elevator for supporting the crucible, and operable to move the crucible between the chambers. The crucible is mounted on the elevator with the lower extremity of the crucible at the opening between chambers and extending into the upper chamber. The furnace is evacuated at room temperature to a pressure of one-half micron. It is then heated to a temperature of 200 degrees centigrade and held at this temperature for a period of 13 hours during which time the evacuation by vacuum pump is continued and the pressure reduced to one-tenth micron at the end of this period. The temperature of the furnace is then raised to 400 degrees centigrade and maintained at this temperature for 23 hours during which time a pressure of one-tenth micron is maintained. At the end of this period, the furnace is filled with helium gas to a pressure of one atmosphere and the furnace temperature raised to approximately 750 degrees centigrade and maintained for 6 hours, melting the charge in the crucible. The temperature of the upper chamber is then lowered to 700 degrees centigrade and maintained while the temperature of the lower chamber is maintained at 460 degrees centigrade. The crucible is then lowered by the elevator at a rate of 1.4 millimeter per hour. After a growing time of approximately 50 hours, the crystal is removed from the furnace and melted out of the crucible by heating the crucible to the melting point of the crystal material for a brief period. The crystal is then annealed by lowering its temperature to room temperature at a rate of approximately 25 degrees centigrade per hour. A crystal so prepared exhibited pulse heights of 93 percent and resolution of 9.3 percent (both relative to thallium activated sodium iodide) when excited by gamma radiation from a cesium 137 source.

Example II

A 2¼ inch diameter platinum crucible is loaded with 520 grams of pure cesium iodide and 2.7 grams of sodium iodide (0.9 mole percent). The crucible is placed into a controlled atmosphere furnace as described in Example I and the furnace is evacuated at room temperature to a pressure of 0.2 micron, requiring approximately 18 hours. The furnace is then heated to a temperature of 200 degrees centigrade and this temperature is maintained for 6½ hours during which time evacuation is continued at 0.2 micron. The temperature of the furnace is then raised to 450 degrees centigrade and held for 20 hours while evacuation is continued and pressure is reduced to 0.1 micron. At the end of this period, the furnace is filled with gas to a pressure of one atmosphere, the gas containing 10 percent hydrogen and 90 percent argon, and the temperature raised to 750 degrees centigrade and maintained for six hours, melting the charge. A Stockbarger type growth and annealing as described in Example I is carried out, requiring approximately 48 hours. The crystal so produced exhibited relative pulse height of 92 percent and a resolution of 9.8 percent in response to gamma radiation from a cesium 137 source, both relative to sodium iodide, thallium activated.

Example III

A 2¼ inch diameter platinum crucible is loaded with 520 grams of pure cesium iodide and 1.8 grams of sodium iodide (0.6 mole percent). The crucible is placed in a controlled atmosphere, Stockbarger type furnace as described in Example I and the furnace is evacuated at room temperature to a pressure of one-tenth micron requiring approximately 25 hours. The furnace temperature is then raised to 250 degrees centigrade and this temperature is maintained for approximately 6 hours during which time vacuum is maintained between 0.1 and 0.2 micron. The temperature of the furnace is then raised to 450 degrees centigrade and held for 25 hours while evacuation is continued at a pressure of 0.1 micron. At the end of this period, the furnace is filled with gas to a pressure of one atmosphere, the gas containing 10 percent hydrogen and 90 percent argon, and the temperature raised to 750 degrees centigrade and maintained for 6 hours, melting the charge. A Stockbarger type growth and annealing as described in Example I is carried out, requiring approximately 47 hours. The crystal so produced exhibited relative pulse height of 90 percent, a resolution of 9.9 percent (both relative to sodium iodide, thallium activated), and a decay constant of 0.65 microsecond.

From the foregoing description, it may be noted that I have provided an improved scintillation crystal, particularly useful in radiation detectors and having good pulse output height, good radiation absorptivity, good decay constant, which produces preferable wave length scintillations and has desirable propertiness of hardiness, nondeliquescence, nonsolarizing, and machinability.

Having thus described this invention in such full, clear, concise and exact terms as to enable any person skilled in the art to which it pertains to make and use the same, and having set forth the best mode contemplated of carrying out this invention, the subject matter which is regarded as being the invention herein is particularly pointed out and distinctly claimed, it being understood that equivalents or modifications of, or substitutions for parts of the above specifically described embodiment of the invention may be made without departing from the true spirit and scope of the invention as set forth in the claims.

The invention claimed is:

1. A scintillator comprising a transparent optically integral [crystalline] *single crystal* material consisting of a major amount of cesium iodide and a minor amount of a sodium compound *in solid solution therein,* said material being characterized by having an emission peak at about 4200±100 angstrom units *wherein the sodium concentration is from about 0.01 mole percent to about 0.220 mole percent.*

[2. A scintillator according to claim 1 wherein the sodium concentration is from about 0.01 mole percent to about 0.220 mole percent.]

[3. A scintillator according to claim 2 wherein the cesium iodide is in the form of a single crystal and the sodium compound is in solid solution therein.]

4. A scintillator according to claim [2 wherein the sodium compound is in solid solution in the cesium iodide and] *1* being further characterized by having an emission band within the range of about 3500 to about 5000 angstrom units and having a decay constant of about 0.65 microsecond.

* * * * *